March 7, 1967 G. H. RAWCLIFFE ET AL 3,308,363
POLE-CHANGING, THREE-PHASE, ALTERNATING CURRENT
MOTOR OR GENERATOR FOR THREE POLE-NUMBERS
Filed April 5, 1963 10 Sheets-Sheet 1

| | SECTION I | SECTION II | SECTION III | SECTION IV |
|---|---|---|---|---|
| Z - POLES SERIES STAR OR DELTA | → | → | → | → |
| Y - POLES 2-PARALLEL STAR | REVERSE | REVERSE | LEAVE | LEAVE |
| X - POLES 4-PARALLEL STAR | REVERSE | LEAVE | REVERSE | LEAVE |

4/6/16-POLE WINDING

Fig. 7a. 8/6-POLE TRANSFORMATION

Fig. 7b.

Fig. 7c. 8/4-POLE TRANSFORMATION

Fig. 7d. 4/6-POLE TRANS.

Fig. 7e.

Fig. 7f. 8/10-POLE TRANSFORMATION

|  | PHASE A | PHASE C | PHASE B |  |
|---|---|---|---|---|
| 4-POLE (n) | +1 -5 -6<br>+10 -14 -15 | -2 -3 +7<br>-11 -12 +16 | +4 -8 -9<br>+13 -17 -18 | (a) |
| 6-POLE (X) (n) | +1 -5 +6<br>-10 +14 -15 | -2 -3 -7<br>+11 +12 +16 | +4 +8 +9<br>-13 -17 -18 | |
| 8-POLE (Y) (n) | +1 +5 +6<br>+10 +14 +15 | +2 +3 +7<br>+11 +12 +16 | +4 +8 +9<br>+13 +17 +18 | |
| 10-POLE (Z) (n) | +1 +5 -6<br>-10 -14 +15 | -2 +3 +7<br>+11 -12 -16 | -4 -8 +9<br>+13 +17 -18 | |
| 6-POLE (X) COMP'NT P | +1 -9 +11<br>-19 +27 -29 | -3 -5 -13<br>+21 +23 +31 | +7 +15 +17<br>-25 -33 -35 | (b) |
| AND COMP'NT Q | +12 -20 +22<br>-30 +2 -4 | -14 -16 -24<br>+32 +34 +6 | +18 +26 +28<br>-36 -8 -10 | |
| 8-POLE (Y) COMP'NT P | +1 +9 +11<br>+19 +27 +29 | +3 +5 +13<br>+21 +23 +31 | +7 +15 +17<br>+25 +33 +35 | |
| AND COMP'NT Q | -12 -20 -22<br>-30 -2 -4 | -14 -16 -24<br>-32 -34 -6 | -18 -26 -28<br>-36 -8 -10 | |
| 10-POLE (Z) COMP'NT P | +1 +9 -11<br>-19 -27 +29 | -3 +5 +13<br>+21 -23 -31 | -7 -15 +17<br>+25 +33 -35 | |
| AND COMP'NT Q | -12 -20 +22<br>+30 +2 -4 | +14 -16 -24<br>-32 +34 +6 | +18 +26 -28<br>-36 -8 +10 | |
| SECTION I | -11 -27 +30 | +14 -23 -31 | -7 -15 +10 | (c) |
| SECTION II | +2 -19 +22 | -3 +6 +34 | +18 +26 -35 | |
| SECTION III | +9 -12 +29 | +5 +13 -32 | +25 -28 +33 | |
| SECTION IV | +1 -4 -20 | -16 +21 -24 | -8 +17 -36 | |
| (C) FINAL ARRANGEMENT OF WINDING FOR 10 POLES. ALL SECTIONS CONNECTED IN SERIES : PHASES DELTA-CONNECTED. COIL-PITCH 5 SLOTS | | | | |

Fig. 8. DERIVATION OF 3-SPEED P.A.M. WINDING FOR 6/8/10 POLES IN 36 SLOTS (SHOWING ALSO 4-POLE CONNECTIONS)

United States Patent Office 3,308,363
Patented Mar. 7, 1967

3,308,363
POLE-CHANGING, THREE-PHASE, ALTERNATING CURRENT MOTOR OR GENERATOR FOR THREE POLE-NUMBERS
Gordon Hindle Rawcliffe, Clifton, Bristol, and William Fong, Redland, Bristol, England, assignors to National Research Development Corporation
Filed Apr. 5, 1963, Ser. No. 271,033
Claims priority, application Great Britain, Apr. 24, 1962, 15,612/62
12 Claims. (Cl. 318—224)

This invention relates to rotary electric machines, particularly to three-phase alternating-current pole-changing motors and generators in which pole-changing is effected by the method of pole-amplitude modulation.

Pole-changing in a three-phase machine by the method of pole-amplitude modulation was first disclosed in a paper on "Induction-Motor Speed-Changing by Pole-Amplitude Modulation" by Professor G. H. Rawcliffe and others in the Proceedings of the Institution of Electrical Engineers, volume 105, part A, No. 22, August 1958. This paper envisaged, and later papers more fully elaborated, machines having a three-phase winding providing a first pole-number of P pole-pairs and an alternative pole-number of either $(P+M)$ or $(P-M)$ pole-pairs, having three phase-windings sequentially arranged around an axis, the electrical phase-sequence A, B, C and phase-band sequence $+A-C+B-A+C-B$ defining a reference sense of rotation around the axis, said phase-bands comprising coils connected together in each phase-winding to provide 2P poles, means for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C or in the phase sequence A, C, B in the said reference sense of rotation as said alternative pole-number is $(P+M)$ pole-pairs or $(P-M)$ pole pairs, respectively.

The method of pole-changing there disclosed consists in applying a similar pole-amplitude modulation wave separately to each one of the phase-windings. Of the two modulated pole-numbers generated simultaneously in each phase-winding by this means, the selected pole-number for modulated operation of the machine is determined by the relative sequence of the three modulation waves.

It has now been found that pole-changing by the method of pole-amplitude modulation can also be effected and explained by a single pole-amplitude modulation wave applied to the three-phase winding as a whole around the winding circumference, instead of to the three phase-windings individually. Such an overall modulation wave is similarly characterised by successive positive and negative half-cycles, the negative half cycles being identified by reversal in circuit of the coils therein. However, successive half-cycles are not necessarily equal in the number of coils of the three-phase winding over which they extend and individual half cycles may extend over coils of consecutive phase-bands, that is, of different phase-windings.

The object of the present invention is to use this method of overall pole-amplitude modulation to provide a rotary electric machine which can be switched to provide any one of three pole-numbers.

Accordingly the present invention provides a three-phase, alternating-current, pole-changing rotary electric machine for providing three alternative pole-numbers, having a three-phase winding wound to provide a first pole-number, the coils of the three-phase winding being connected in a first manner for this first pole-number and alternatively connected in a second manner, corresponding to an overall pole-amplitude modulation wave having an odd number of cycles, to provide a second pole-number and further alternatively connected in a third manner, corresponding to an overall pole-amplitude modulation wave having an even number of cycles, to provide a third pole-number.

It is important to note that the third pole-number provided by an even-cycle modulation wave, may be greater or may be less than the second pole-number, provided by an odd-cycle modulation wave.

Each phase-winding of the three-phase winding may be considered as comprising coils serially grouped in four similar sections. It is preferred to provide the smallest of the three alternative pole-numbers by four-parallel connection of the four sections of each phase-winding, to provide the middle pole-number by two-parallel connection each of two sections and to provide the largest of the pole-numbers by serial connection of the four sections.

Thus, the most practical switching arrangement for the smallest, middle and largest pole-numbers respectively provides four-parallel star, two-parallel star and series connection, either series-delta or series-star, connections of the three phase-windings.

In order that the invention may readily be carried into practical effect, the underlying theory of the invention will be more fully explained with reference to three practical embodiments, given by way of example, and with reference to the accompanying drawings of which.

In the drawings, FIGS. 1 to 4 show a three-phase winding having three phase-windings A, B and C. Phase-winding A comprises four sections serially connected between terminals $a_1$, $a_2$, $a_3$, $a_4$ and $a_5$. Phase-winding B similarly comprises four sections serially connected between terminals $b_1$, $b_2$, $b_3$, $b_4$ and $b_5$. Phase-winding C similarly comprises four sections serially connected between terminals $c_1$, $c_2$, $c_3$, $c_4$ and $c_5$.

Figure 1:
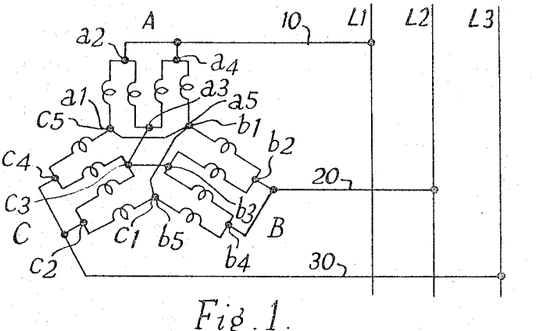
FIG. 1 is a circuit diagram of a three-phase winding connected in four-parallel star, to provide a three phase magnetomotive force waveform corresponding to X-poles in the general analysis of the invention.
Figure 2:
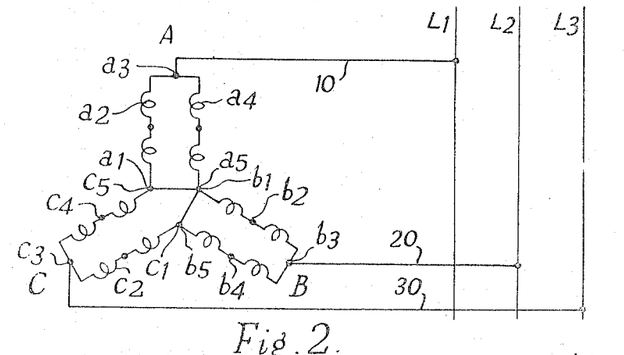
FIG. 2 is a circuit diagram of the three-phase winding of FIG. 1 connected in two-parallel star to provide Y-poles.
Figure 3:
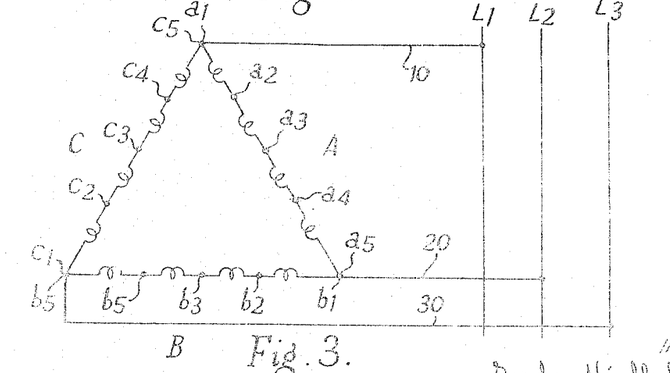
FIG. 3 shows the same three-phase winding connected in series-delta to provide Z-poles.

In FIGS. 1, 2 and 3, the three phase-windings A, B and C are joined to one another at both ends, so that the pairs of terminals $a_5$, $b_1$; $b_5$, $c_1$ and $c_5$, $a_1$ are common and FIG. 3 shows a series-delta arrangement of the windings.

In FIG. 1, a four-parallel star connection is provided by additionally connecting together in pairs terminals $a_2$, $a_4$; terminals $b_2$, $b_4$ and terminals $c_2$, $c_4$ of the three phase-windings and by joining together the terminals $a_3$, $b_3$ and $c_3$ and the terminals $a_1$, $b_1$ and $c_1$ of the three phase-windings.

In FIG. 2, a two-parallel star connection is provided by connecting together solely terminals $a_1$, $b_1$ and $c_1$ of the three phase-windings.

In FIG. 3, a series-delta connection is provided by the common end-terminals of the three phase-windings, as stated.

Figure 4:
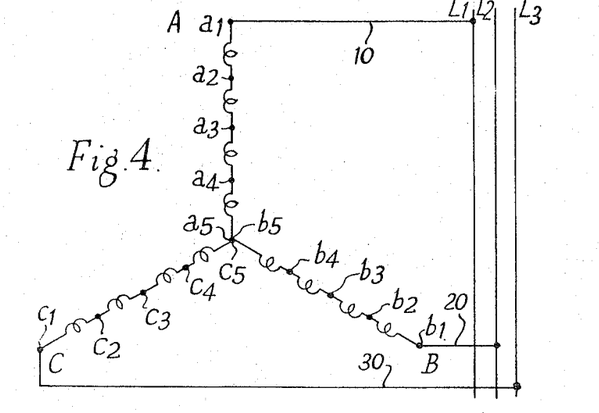
FIG. 4 shows an alternative arrangement of the same three-phase winding for connection in series-star to provide Z-poles.

In FIG. 4, an alternative series-star connection is provided by separating the common end-terminals of FIG. 3 and joining together the terminals $a_5$, $b_5$ and $c_5$ of the three phase-windings.

In FIGS. 1, 2 and 4, the phase-windings A, B and C are respectively supplied by lines 10, 20 and 30 from phases $L_1$, $L_2$ and $L_3$. In the series-delta arrangement of FIG. 3, the three phase windings are supplied by the lines 10, 20 and 30 respectively to the common end-terminal pairs $a_1$, $c_5$; $b_1$, $a_5$ and $c_1$, $b_5$.

In the following general discussion of machines according to the invention providing three alternative pole-numbers, the three pole-numbers are referred to as X-poles, Y-poles and Z-poles where X, Y and Z are, of course always even numbers and usually X is less than Y and Z is greater than Y. The three pole-numbers are always provided by the same connections of the phase-windings, thus:

X-poles, 4-parallel star—FIG. 1
Y-poles, 2-parallel star—FIG. 2
Z-poles, Series-delta—FIG. 3
or Z-poles, Series-star—FIG. 4

Figures 5A, 5B:
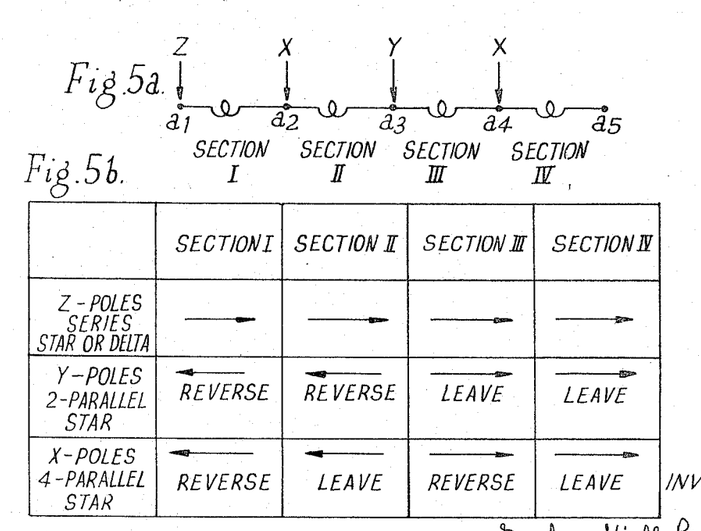
FIG. 5a is a diagram of a single phase-winding of the three-phase winding of FIGS. 1 to 4, showing the current input points for three pole-numbers X-poles, Y-poles and Z-poles.
FIG. 5b is a table indicating the relative sense of current flow in the four-sections of the phase-winding of FIG. 5a, for the three pole-numbers X-poles, Y-poles and Z-poles.

FIG. 5a shows phase-winding A, the four sections serially connected between terminals $a_1$, $a_2$, $a_3$, $a_4$ and $a_5$ being referenced I, II, III and IV respectively. The arrows above the phase-winding indicate the current input point or points for the three pole-numbers X, Y and Z, correspondingly, and the table of FIG. 5b shows the relative sense of current flow in each of the four sections for each of the three pole-numbers.

Phase-windings B and C are arranged and connected in comparable manner as phase-winding A, for each pole-number.

Two of the pole-numbers are derived from each other by a pole-amplitude modulation wave applied to the whole three-phase winding, having an even number of modulation cycles. This is referred to as even-cycle modulation. Each of these pole-numbers is derived from the third pole-number by a pole-amplitude modulation wave having an odd number of cycles; referred to as odd-cycle modulation.

There are two general classes of machines according to the invention.

For Class I machines, the change from four-parallel (X-poles) connection to series (Z-pole) connection is even-cycle modulation, so that the pole-numbers X and Z are related according to the series:

$$Z=(X+4), (X+8) \text{ and so on}$$

In this case, the change from four-parallel (X-pole) connection to two-parallel (Y-pole) connection is odd-cycle modulation. Hence the pole-numbers X and Y are related according to the series:

$$Y=(X+2), (X+6) \text{ and so on}$$

For Class II machines, the change from four-parallel (X-pole) to two-parallel (Y-pole) connection represents even-cycle modulation, so that the pole-numbers X and Y are related according to the series:

$$Y=(X+4), (X+8) \text{ and so on}$$

In this case the change from two-parallel (Y-pole) to series (Z-pole) connection represents odd-cycle modulation. Hence the pole numbers X and Z are related according to the series:

$$Z=(X+2), (X+6) \text{ and so on}$$

The correlations of alternative pole-numbers are set out in the following two tables:

CLASS I

| X-poles 4-parallel | Y-poles 2-parallel | Z-poles Series |
|---|---|---|
| X | X+2 | X+4 |
| X | X+6 | X+8 |
| X | X+10 | X+12 |
| | etc. | etc. |

CLASS II

| X-poles 4-parallel | Y-poles 2-parallel | Z-poles Series |
|---|---|---|
| X | X+4 | X+2 |
| X | X+8 | X+6 |
| X | X+12 | X+10 |
| | etc. | etc. |

Hence, in the design of any machine according to the present invention, the first requirement is that the three alternative pole-numbers to be provided shall be related to one another as provided by a choice of pole-numbers, one from each column, X-poles, Y-poles and Z-poles, of one or the other of the two tables, Class I or Class II, given above.

It will immediately follow from the two tables above that with a given choice of X-poles for the four-parallel connection, the pole-number X-poles+Z (an odd number of pole-pairs) is obtainable by two-parallel connection with a Class I machine or by series connection with a Class II machine. Similarly, the pole-number X-poles+Z (an even number of pole-pairs) is obtainable by series connection with a Class I machine or by two-parallel connection with a Class II machine.

However, a practical design consideration establishes a second rule for design that preferably the three pole-numbers are related thus:

X is less than Y
Y is less than Z

This rule follows from the practical requirement to provide comparable values for the air-gap flux-densities for all the three pole-numbers. For this purpose, it is necessary to have the largest number of conductors in series for the largest pole-number (Z-poles) and the smallest number in series for the smallest pole-number (X-poles).

The third rule of design has been referred to earlier in this specification and also follows from the two tables given:

(A) Two of the three alternative pole-numbers differ by (an even number of pole-pairs) and are derived, one from the other, by even-cycle modulation.

(B) The two pole-numbers of (A) above, related by even-cycle modulation, are each related to the third alternative pole-number by odd-cycle modulation.

The fourth design rule is that the number of cycles of the pole-amplitude modulation wave for odd-cycle modulation and even-cycle modulation are both defined as either the sum or the difference of the two pole-numbers thus related, expressed in pole-pairs. Alternatively, of course, the sum or difference of the pole-numbers defines the modulation wave in half-cycles.

A machine providing three alternative pole-numbers can be designed following the four rules given above but it is preferred also to follow a fifth rule in order to eliminate harmonics from the waveforms at the three operative pole-numbers.

According to the fifth rule, undesirable harmonics are eliminated in two ways:

(A) A three pole-number three-phase winding is derived in the minimum number of slots; most commonly in 18-slots, following the four rules above. Two or more such three-phase windings, most commonly only two, are combined on the same frame of double, or a multiple of the said number of slots. In combining the windings, the spacing of corresponding coils of the different basic three-phase windings is chosen to neutralize undesired harmonics. The basic windings can be energized so that they are additive or differential in effect, at choice, and the choice need not be the same for all three pole-numbers. It is not essential for each basic winding to have the same coil-grouping.

(B) For all the basic three-phase windings, the coil-pitch is chosen for elimination of undesired harmonics, having due regard to the requirement of closely similar air-gap flux-densities for the three pole-numbers.

The latter design requirements are, in themselves, well-known to those skilled in the art of rotary electric machine design.

The expedients of (A) and (B) above relate to harmonics of the waveform of an operative pole-number. Sub-harmonics, it has been found, even if present in quite large magnitude, have a negligible effect on the performance of squirrel-cage induction motors, and can be ignored in the design.

Having defined the design requirements of machines according to the invention in general terms, it will now be most informative to give examples of specific pole-number combinations.

An example of both Class I and Class II machines, defined above, has been chosen, the first giving alternatively 6-poles, 8-poles and 10-poles and the second giving alternatively 4-poles, 6-poles and 16-poles.

The first example represents a choice of three pole-numbers from four possible alternative pole-numbers.

Figure 6A:
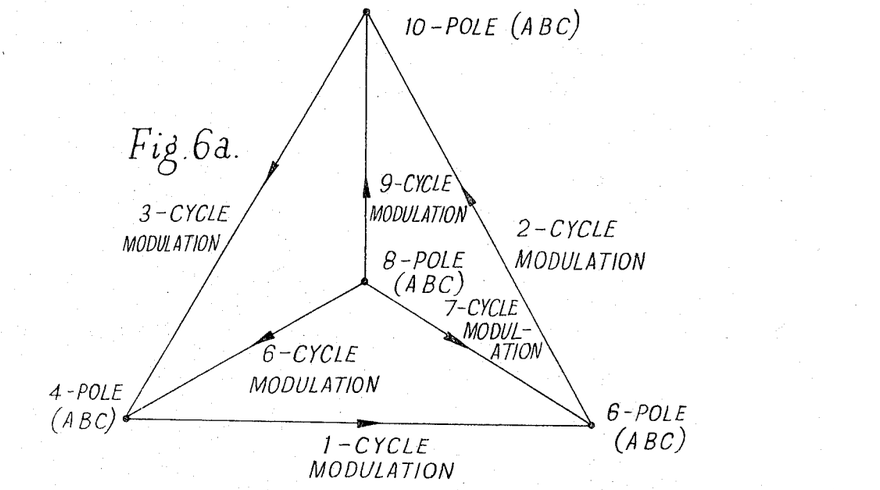
FIGS. 6a and 6b are two pole-amplitude modulation diagrams showing the mutual relationship of four alternative pole-numbers and the related pole-amplitude modulation waveform for two general classes of machines, respectively, both classes providing three alternative operative pole-numbers from the four possible alternatives.

FIG. 6a is a diagram showing the four possible pole-numbers and the number of cycles in the pole-amplitude modulation wave by which each pair of the four pole-numbers is related to each other.

Figure 6B:
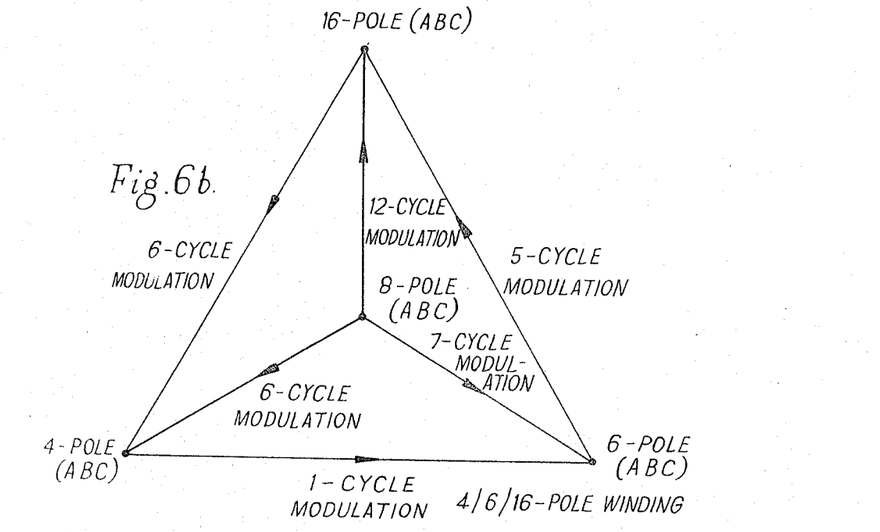

FIG. 6b is a similar diagram showing the correlation, by modulation, of the three pole-numbers 4-poles, 6-poles and 16-poles and each one thereof with a fourth pole-number of 8-poles.

From FIG. 6a, it may be seen how the pole-numbers for four different machines are correlated, that is for each combination of three from the four possible pole-numbers. The combinations are as follows:

6-pole, 8-pole and 10-pole (the example chosen)
4-pole, 6-pole and 8-pole
4-pole, 8-pole and 10-pole and
4-pole, 6-pole and 10-pole From FIG. 6b, three of the combinations provide a machine according to the present invention as follows:

4-pole, 6-pole and 16-pole (the example chosen)
4-pole, 6-pole and 8-pole and
6-pole, 8-pole and 16-pole.

In FIGS. 6a and 6b, the letters in brackets show the phase-sequences for all the pole-numbers corresponding to the same sense of rotation. It will be noted that modulation by a pole-amplitude modulation wave which has a number of cycles equal to the difference of the pole-pair numbers causes no reversal of sequence, whereas modulation by the sum of the pole-pair numbers causes reversal of sequence.

For machines according to FIG. 6a, the pole-numbers 6-poles, 8-poles and 10-poles can be obtained with twelve switching terminals.

Figure 7A:
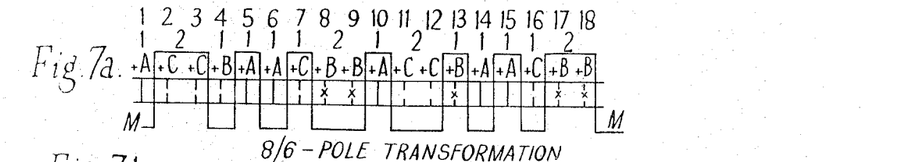
FIGS. 7a to 7f inclusive are diagrams showing the different forms of pole-amplitude modulation for a three-phase winding corresponding to the arrangements shown in FIG. 6a, where the possible alternative pole-numbers are 4-poles, 6-poles, 8-poles and 10-poles and the basic three-phase winding is would in an 18-slot frame.
Figure 7B:
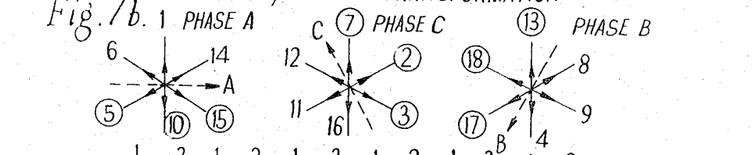
Figure 7C:
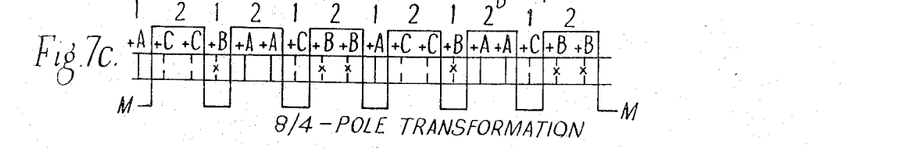
Figure 7D:
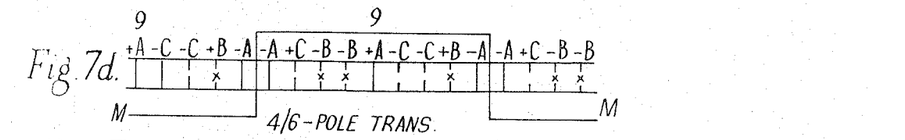
Figure 7E:
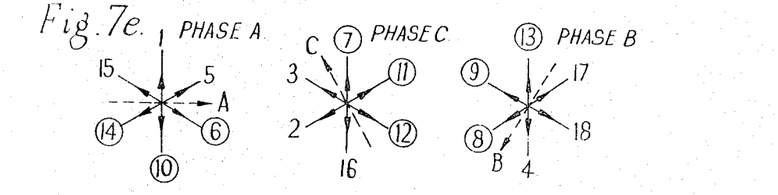
Figure 7F:
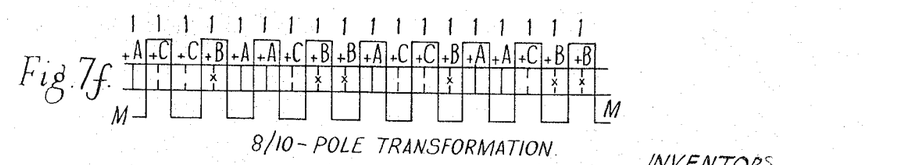
Figure 9:
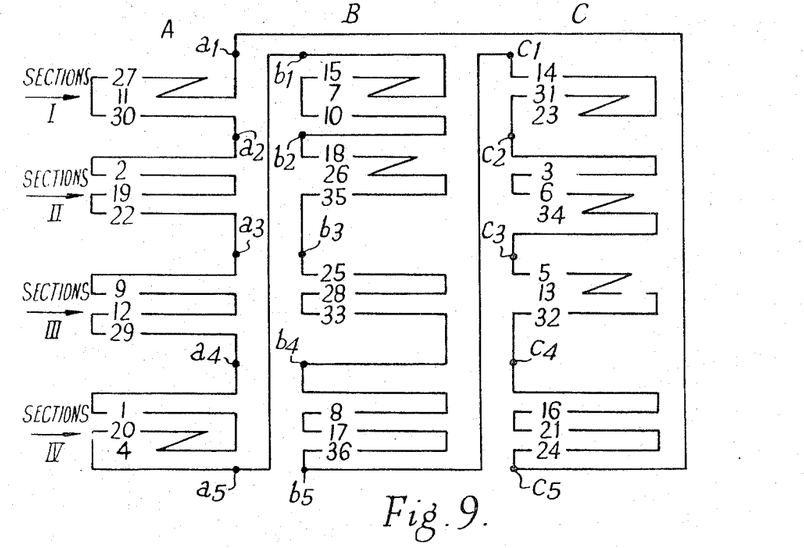
FIG. 9 is a simplified form of slot-winding diagram for the derived 6-pole, 8-pole and 10-pole winding of FIG. 8c.
Figure 10:
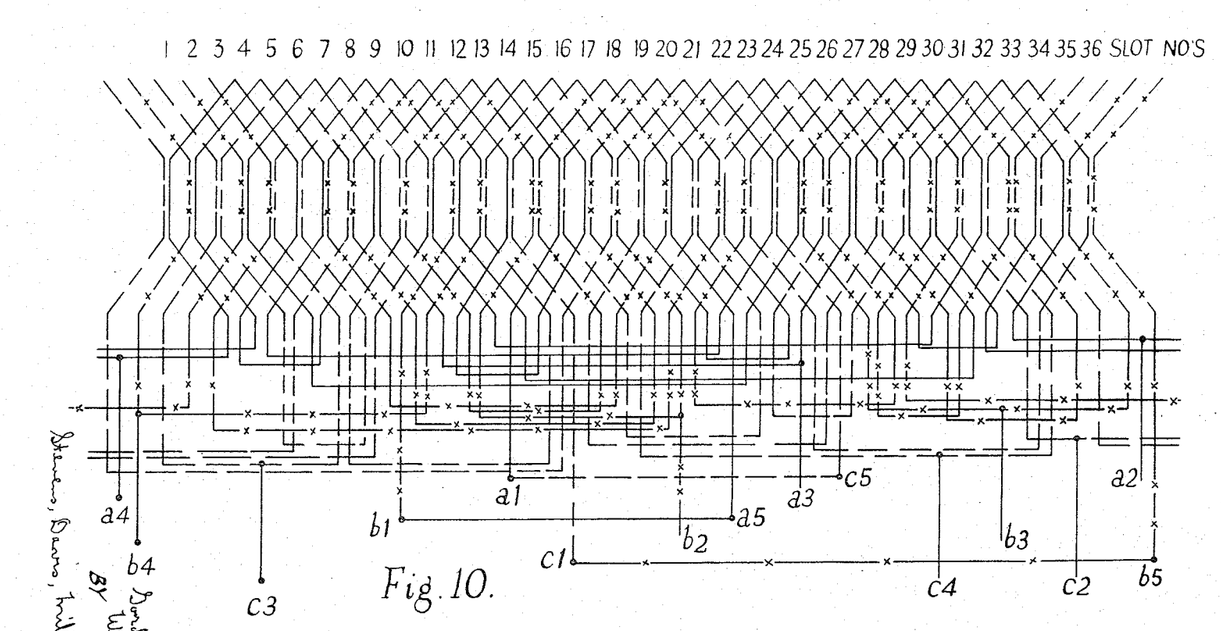
FIG. 10 is a conventional slot-winding diagram of the winding of FIG. 9.

FIGS. 7a and 7f relate to the 6-pole, 8-pole and 10-pole machine of FIG. 6a and show the design procedure by which the machine of FIGS. 9 and 10 is evolved employing the rules defined above.

FIG. 7a shows an unmodulated 8-pole, 120° spread, three-phase winding in 18 slots. The slots are numbered in the first row of numerals at the head of FIG. 7a. The coil grouping of the winding per phase is:

+1+2+1+2 (coils per pole-pair)

The original phase-sequence is A, C, B.

The line M—M shows the 7-cycle pole-amplitude modulation wave which provides a transformation of the winding to 6-poles. The second row of numerals indicates the number of coils of each half-cycle of the modulation wave.

The line M—M of FIG. 7a is drawn around the coils which are reversed upon modulation, that is, coils in slots 2, 3, 5, 7 and so on. Since, by the definition given earlier herein, reversal corresponds to the negative half-cycles of the modulation waves, the line M—M of FIG. 7a represents a modulation wave the negative half-cycles of which are above and the positive half-cycles are below. The same is true for the modulation waves M—M of FIGS. 7c, 7d and 7f and FIGS. 11a, 11b and 11c.

The row of letters above the winding diagram in FIGS. 7a, 7c, 7d and 7f indicates the phase with which the coil in each slot is associated and the relative sense of energisation, before modulation.

Figure 11A:
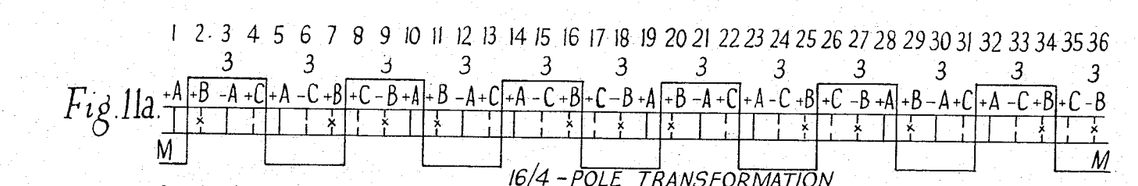
FIGS. 11a to 11d inclusive are diagrams showing the different forms of pole-amplitude modulation for a three-phase winding corresponding to the arrangements shown in FIG. 6b, where the chosen alternative pole-numbers are 4-poles, 6-poles and 16-poles and the winding is wound in a 36-slot frame.
Figure 11B:
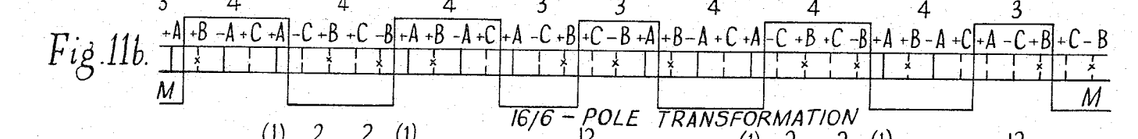
Figure 11C:
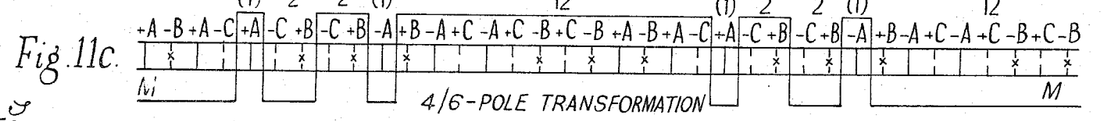
Figure 13:
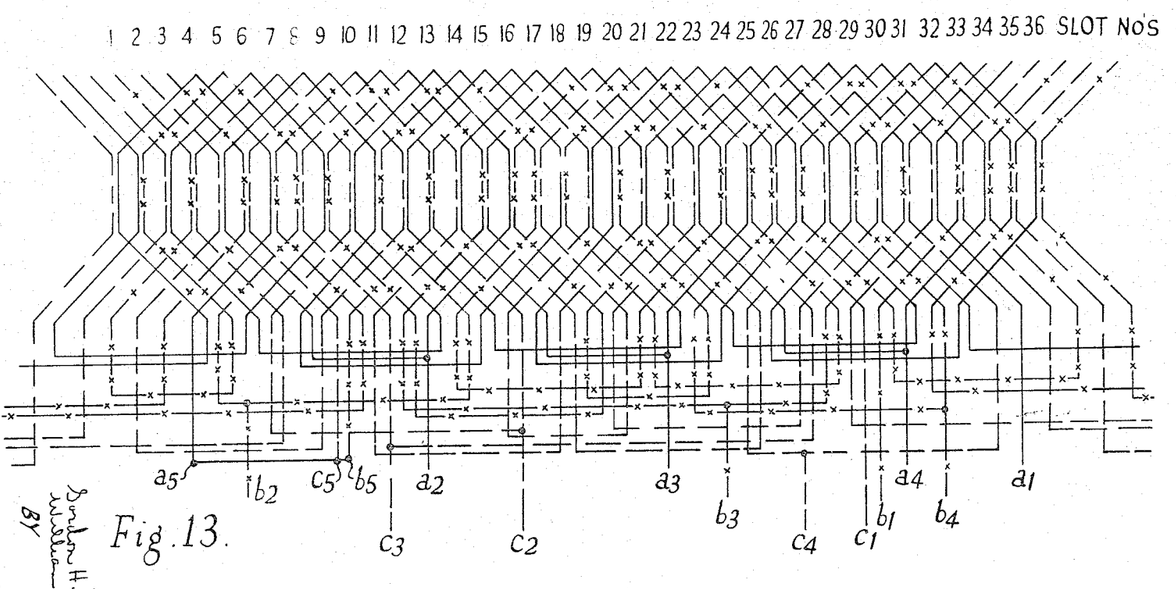
FIG. 13 is a conventional slot-winding diagram of the winding of FIG. 12.

Throughout these winding diagrams, in those of FIGS. 11a, 11b, 11c and in FIGS. 9 and 13, phase A coils are represented in solid line, phase B coils in —x— line and phase C coils in broken line.

FIG. 7b shows slot-star diagrams for the three phases with the winding operating as a 6-pole winding. Each coil is represented by its slot-number and the reversed coils are shown in a circle. The phase sequence after modulation is A, B, C.

FIG. 7c is a winding diagram of the same basic 8-pole, 120° spread winding of FIG. 7a with a 6-cycle pole-amplitude modulation wave M—M superimposed showing the transformation for 4-pole working. The phase sequence is A, C, B, before modulation and A, B, C after modulation.

FIG. 7d shows the original 4-pole, 60° spread winding modulated by a single-cycle pole-amplitude modulation wave M—M to provide 6-poles.

FIG. 7e shows slot-star diagrams for the three phases for 6-pole working according to the transformation of FIG. 7d. Each coil is represented by its slot-number, those reversed by modulation being shown in a circle. The phase sequence is A, B, C, before modulation and after modulation.

FIG. 7f shows the original 8-pole, 120° spread winding with a 9-cycle pole-amplitude modulation wave M—M superimposed.

Figure 8:
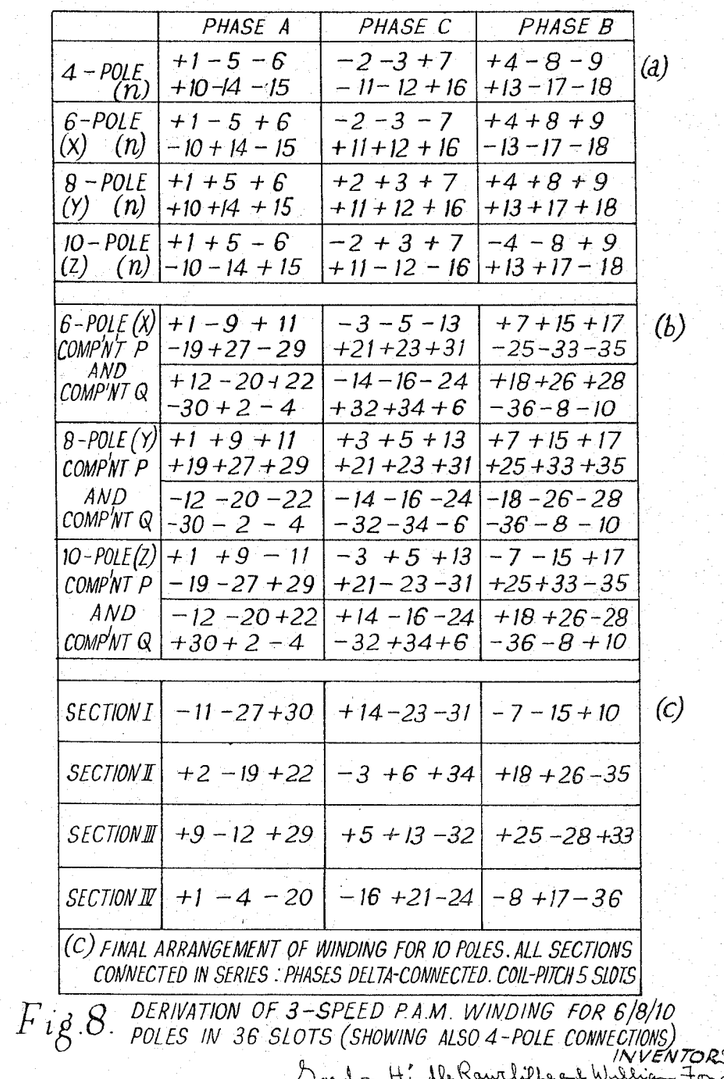
FIG. 8 is a table arranged in three parts showing in its first part (a) the connections of all coils of the basic three-phase winding of FIGS. 7a to 7f for the four possible alternative pole-numbers, in its second part (b) the combination of the same basic three-phase winding with a second three-phase winding to provide a practical pole-changing three-phase winding in 36-slots, and in its third part (c) the resultant arrangement when connected to provide 10-poles.

FIG. 8 is a table in three parts showing in part (a) the connections of every coil of each phase for each of the four alternative pole-numbers, each coil being identified by the slot-number of an 18-slot frame.

Part (b) of the table shows the same winding of part (a) spread out to occupy the full circumference but half the slots of a 36-slot frame. If this rearrangement starts from slot 1, it leaves every even-numbered slot empty. If Na is the slot-number of part (a) and Nb is the slot number of part (b), $$Nb = 2Na - 1$$

The coils are identified by these odd slot-numbers and this part of a composite winding is identified as component P.

Below, identified as component Q, is a similar winding occupying the even-numbered slots. Obviously the two components can be spaced by any odd number of slots.

Having regard to the waveform at the three pole-numbers chosen, the preferred spacing in this example is 11 slots.

In FIG. 8(b) component Q is shown with the coils identified by the even slot-numbers corresponding to 11-slots spacing from component P.

Spacing of 11 slots corresponds to spacing of 1⅚ pole-pitches for 6-poles, 2⅘ pole-pitches for 8-poles and 3 1/18 pole-pitches for 10-poles. Consequently, it is necessary to connect components P and Q in series in the same sense for 6-poles and differentially for 10-poles so that the resultant effect is additive. For 8-poles, the two components may be connected either differentially or additive. From consideration of air-gap flux-density ratio, differential connection is preferred.

FIG. 8(b) shows the coils of both components P and Q, identified by slot-number, preceded by a sign showing the relative direction of connection for each of the chosen alternative pole-numbers 6-poles, 8-poles and 10-poles.

FIG. 8(c) shows the final arrangement of the composite winding with relative direction of coil connection for 10-pole operation, that is Z-poles and series connection (see FIG. 5b). The four sections I, II, III, IV of FIG. 5a are shown.

There remains the choice of pole-pitch for the winding. As stated above, this also is determined by waveform considerations.

An unorthodox winding, for either 6-poles or 10-poles, is liable to produce certain odd harmonics, of which the 14-pole harmonic may be particularly large. To remove this harmonic, for both 6-pole and 10-pole operation, a coil-pitch of 5 slots is chosen. This, for the 36 slot frame, is equivalent to 1 17/18 pole-pitches of a 14-pole wave.

In the 6-pole connection, a 10-pole harmonic will be produced in each of the components P and Q considered separately. Since these two component windings are connected in the same sense, however, for operation at 6-poles, the harmonic waves of the two component windings substantially neutralise each other.

The three phase-windings of FIG. 8(c) are series-delta connected for 10-poles. The winding is two-parallel star connected for 8-poles and four-parallel star connected for 6-poles. The sense of current flow for each of the four sections for each of the three pole-numbers will be seen from the tables of FIG. 8(c) and FIG. 5b.

The corresponding circuit diagram for 10-poles, 8-poles and 6-poles is given by FIG. 3, FIG. 2 and FIG. 1 respectively.

FIG. 9 is a simplified slot winding diagram showing the composite winding of FIG. 8(b) arranged in the four sections of FIG. 8(c) and showing the terminal connections of FIG. 3.

For this winding, the winding factor ratios are:

6-pole, 0.622; 8-pole, 0.534; 10-pole, 0.689 and the flux-density ratios are:

6-pole, 1.29; 8-pole, 1.00; 10-pole, 0.84

FIG. 10 is a conventional slot-winding diagram of the same composite winding and corresponds to the simplified diagram of FIG. 9. The interconnections between the three phase-windings correspond to the series-delta connections of FIG. 3.

FIGS. 11a to 11d, 12 and 13 relate to the 4-pole, 6-pole and 16-pole example of FIG. 6b.

FIG. 11a shows a three-phase winding which is a 16-pole, 60°—spread winding in a 36 slot frame having four phantom (omitted) coil-groups per phase. The resultant coil grouping per phase is thus:

$$+1-1+1-0+1-1+1-0+1-1+1-0$$
$$+1-1+1-0$$

The slot numbers are shown in the first row of FIG. 11a. The line M—M shows a 6-cycle pole-amplitude modulation wave, the second row of numbers showing the number of coils per half-cycle of the modulation wave. The third row shows the phase-band of each slot and the relative direction of connection before modulation. Modulated in this manner, the winding operates to provide 4-poles.

FIG. 11b shows the same basic 16-pole winding of FIG. 11a modulated by a 5-cycle pole-amplitude modulation wave M—M to provide 6-poles.

FIG. 11c shows the relationship of the modulated 4-pole winding derived in FIG. 11a and the modulated 6-pole winding derived in FIG. 11b. It will be seen that the 4-pole, 6-pole transformation corresponds to an essentially single-cycle modulation wave M—M, subject to the irregularities indicated by the coil group numbers (1) in brackets.

Figure 11D:
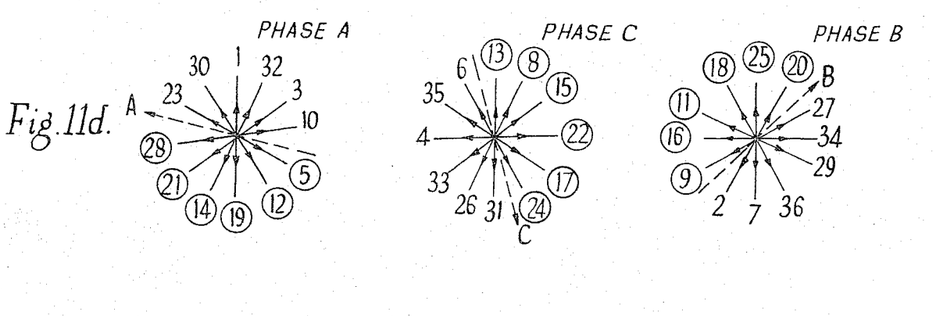

FIG. 11d shows slot-star diagrams for the three phases for 6-pole working the reversed coils, according to the transformation of FIG. 11c, being shown in circles.

Figure 12:
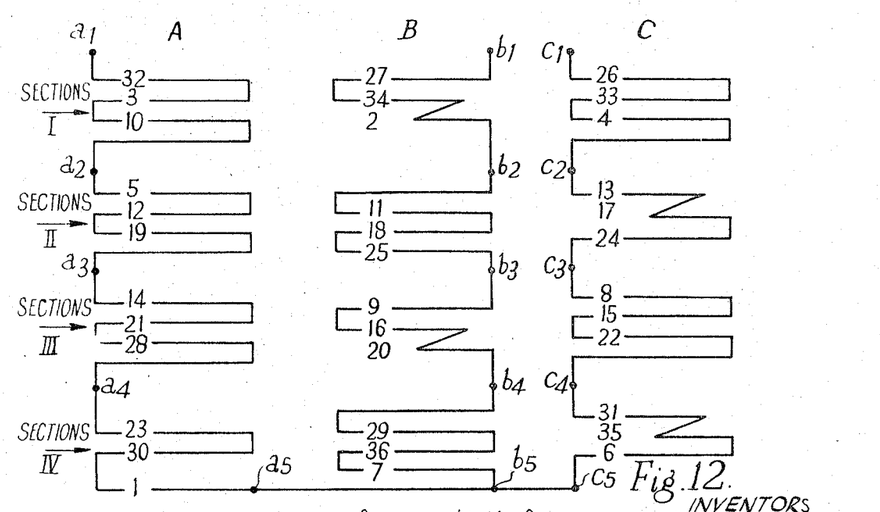
FIG. 12 is a simplified form of slot-winding diagram for the 4-pole, 6-pole and 16-pole winding of FIGS. 11a to 11d.

FIG. 12 is a simplified slot winding diagram showing the three phase-windings A, B and C and the slots in which the forward conductors of all coils of each phase-winding are placed according to the arrangement of FIGS. 11a, 11b and 11c. The terminal connections are those shown in FIGS. 1, 2, 4 and 5a, the four sections of each phase-winding are marked correspondingly to FIG. 5b and the interconnections between the three phase-windings provide the series-star connection of FIG. 4.

The three-phase winding of FIG. 12 provides 16-poles in the series-star connection of FIG. 4, 6-poles in the two-parallel star connection of FIG. 2 and 4-poles in the four-parallel star connection of FIG. 1.

Referring to both FIG. 6b and FIGS. 11a, 11b and 11c, it will be seen that the winding of FIG. 12 has even-cycle (6-cycle) modulation from X-poles (4-poles) to Z-poles (16-poles), odd-cycle (single-cycle) modulation from X-poles (4-poles) to Y-poles (6-poles) and odd-cycle (5-cycle) modulation from Y-poles (6-poles) to Z-poles (16-poles).

Because the highest pole-number (Z-poles) is a large pole-number in relation to the number of slots of the frame, so that already the 16-pole winding has four phantom (omitted) coil-groups per phase and because this arrangement provides three coil-groups per pole per phase at 4-pole working, it is not necessary to construct this winding as to component three-phase windings spaced apart, as in the 6-pole, 8-pole and 10-pole example.

In this 4-pole, 6-pole and 16-pole example, the waveform at the three alternative pole-numbers is rendered free from undesirable harmonics by choice of coil-pitch. A satisfactory choice for this example is a pitch of six slots or a pitch of seven slots.

For these two alternatives, the winding factor and air-gap flux-density ratios are given below:

*Pitch 6 slots*—Winding factor
    4-poles, 0.732; 6-poles, 0.644; 16-poles, 0.832
*Pitch 6 slots*—Air-gap flux-density
    4-poles, 1.00; 6-poles, 0.85; 16-poles, 0.88
*Pitch 7 slots*—Winding factor
    4-poles, 0.793; 6-poles, 0.622; 16-poles, 0.945
*Pitch 7 slots*—Air-gap flux-density
    4-poles, 1.00; 6-poles, 0.95; 16-poles, 0.84

FIG. 13 shows the slot winding diagram, in conventional form, of the three-phase winding of FIG. 12, using a coil pitch of 6-slots, that is slot 1 to slot 7 and so on throughout. The slot number are shown at the top of the diagram, the coils of the three phases are indicated by the same convention as in FIGS. 7a to 7f, FIG. 10 and FIGS. 11a to 11c, that is phase A in full-line, phase B is —x— line and phase C in broken line. The terminal connections are as shown in FIGS. 1, 2, 4 and 12 and the interconnections between the three phase-windings correspond to those of FIGS. 4 and 12.

Figure 14:
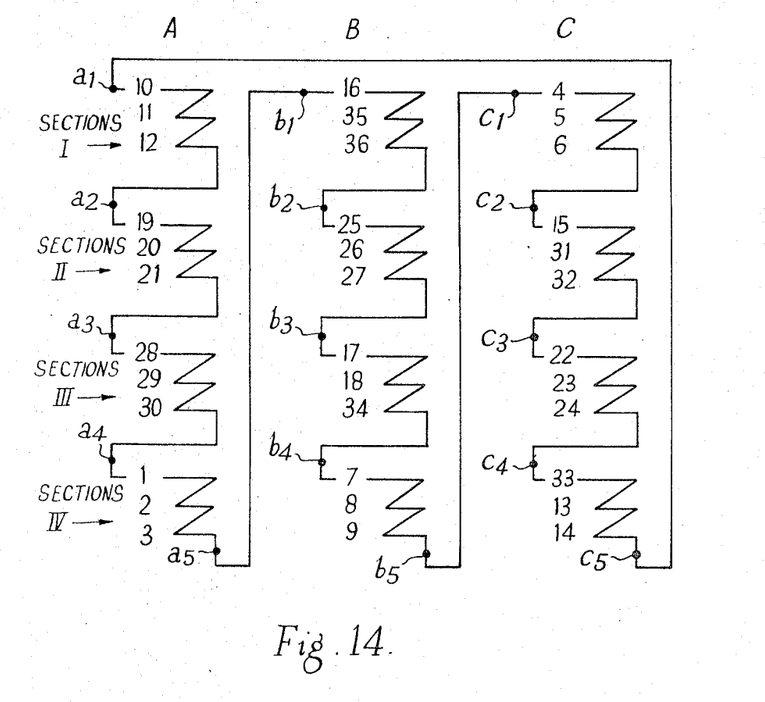
FIG. 14 is a simplified form of slot-winding diagram of a three-phase winding wound in 36-slots, providing alternative pole-numbers of 4-poles, 6-poles and 8-poles, by way of further illustration of the invention.

By way of further illustration of the invention, a three-phase winding, wound in a 36-slot frame, providing alternatively 4-poles, 6-poles and 8-poles is shown in FIG. 14. FIG. 14 is a simplified slot winding diagram corresponding to those of FIGS. 9 and 12. The three phase-windings are shown at A, B and C and the slot-number of every coil of each phase-winding is shown beneath. The four sections of each phase-winding correspond to FIG. 5a, the terminal connections correspond to FIGS. 1, 2 and 3. The interconnections between the phase-windings correspond to the series-delta connection of FIG. 3.

With the winding of FIG. 14, 4-pole working is provided by the four-parallel connection of FIG. 1, 6-pole working by the two-parallel connection of FIG. 2 and 8-pole working by the series-delta connection of FIG. 3.

The winding of FIG. 14 is basically a 4-pole, integral-slot winding having three slots per pole per phase. The 4-pole winding is pole-amplitude modulated by an odd-cycle (single-cycle) modulation wave to provide pole-numbers of 2-poles and 6-poles together. The pole-number of 6-poles is used and the sub-harmonic of 2-poles is ignored.

Subsequently, the 6-pole winding is pole-amplitude modulated by an odd-cycle (7-cycle) modulation wave to provide 8-poles and 20 poles together. The pole-number of 8-poles is used and the 20-pole harmonic is reduced by chording. To this end a coil-pitch of six slots, that is slot 1 to slot 7 and so on throughout, is used.

For this coil-pitch, the air-gap flux-density ratios are:

4-pole, 1.03; 6-pole, 1.00; 8-pole, 1.02

What we claim is:

1. An alternating current pole-changing rotary electric machine for three-phase running at three alternative pole-numbers related to one another in that, where one pole-number is X-poles, a second is a pole-number selected from the series: $(X+2)$, $(X+6)$, $(X+10)$ and so forth, and the third is a pole-number selected from the series: $(X+4)$, $(X+8)$, $(X+12)$ and so forth, having three phase-windings comprising coils wound in slots and serially connected together in four winding sections in each phase-winding defined by connecting taps, to provide one of said second and third pole-numbers, being reconnected at said taps as a series-parallel arrangement of two parallel circuits each of two said sections, to provide the other one of said second and third pole-numbers and being reconnected at said taps as a four-parallel arrangement, each of one said section, to provide said pole-number of X-poles.

2. A three-phase, alternating current pole-changing rotary electric machine as claimed in claim 1 in which the lowest pole-number is provided by the four-parallel connection and the highest pole-number is provided by the series connection of said winding sections.

3. A pole-changing rotary electric machine as claimed in claim 1, in which the smallest pole-number of the three alternative pole-numbers is provided by four-parallel connection of four equal sections of each phase-winding, the middle pole-number is provided by two-parallel connection each of two of the four phase-winding sections and the largest pole-number is provided by series connection of the four phase-winding sections.

4. A pole-changing rotary electric machine as claimed in claim 1 having the coil-pitch of the windings chosen to reduce the harmonic content of the waveform, corresponding to an unwanted pole-number resulting from pole-amplitude modulation, at one at least of the three alternative pole-numbers.

5. A pole-changing rotary electric machine having a three-phase winding which is the combination of at least two component three-phase energised windings as claimed in claim 1 spaced apart around the slots of a common frame.

6. A pole-changing rotary electric machine as claimed in claim 5, in which the spacing between the component windings and the relative senses in which the component windings are energised provides a reduction of an unwanted harmonic at one at least of the three alternative pole-numbers.

7. A three-phase, alternating current pole-changing rotary electric machine for providing three alternative pole-numbers of which the lowest pole-number is X-poles, a second is a pole-number forming one of the series $(X+2)$, $(X+6)$, $(X+10)$ and so forth, and the third is a pole-number forming one of the series $(X+4)$, $(X+8)$, $(X+12)$ and and so forth, having three phase-windings comprising coils wound in slots, serially connected together in four sections of each phase-winding defined by connecting taps, to provide one of said second and third pole-numbers, being reconnected at said taps as a series-parallel arrangement of two parallel circuits each of two said sections, to provide the other one of said second and third pole-numbers and being reconnected at said taps as a four-parallel arrangement, each of one said section, to provide said pole-number of X-poles, the coils of the three phase-windings being arranged in a succession to fill said slots and to define successive phase-bands, each change of connection from one to another of the three said alternative connections defining a pole-amplitude modulation wave applied to the three-phase winding as a whole, said wave being made of positive half-cycles, defined by coils unchanged in current-carrying sense by said change of connection, and of negative half-cycles, defined by coils reversed in current carrying sense by said change of connection, the total number of cycles of said wave around the circumference of the three-phase winding corresponding to the sum and the difference of the pole-numbers provided by said one and said other alternative connection, when the phase-sequence is reversed and when the phase-sequence is not reversed, respectively.

8. A three-phase, alternating current pole-changing rotary electric machine as claimed in claim 7, in which the lowest pole-number is provided by the four-parallel connection and the highest pole-number is provided by the series connection of said winding sections.

9. An alternating current pole-changing rotary electric machine for three-phase running at three alternative pole-numbers, having three phase-windings comprising coils serially connected together to provide one of the three said pole-numbers said coils comprising four sections defined by connecting taps, said sections being reconnected as a series-parallel arrangement, each said series connection comprising one half the number of said coils, to provide a second of said pole-numbers and said sections being reconnected as a four-parallel arrangement to provide the third of said pole-numbers, said pole-numbers being related to one another in that, where one pole-number is X-poles, a second is a pole-number selected from the series: $(X+2)$, $(X+6)$, $(X+10)$ and so forth, and the third is a pole-number selected from the series: $(X+4)$, $(X+8)$, $(X+12)$ and so forth.

10. A three-phase, alternating current pole-changing rotary electric machine for providing three alternative pole-numbers of which the lowest pole-number is X-poles, a second is a pole-number forming one of the series: $(X+2)$, $(X+6)$, $(X+10)$ and so forth, and the third is a pole-number forming one of the series: $(X+4)$, $(X+8)$, $(X+12)$ and so forth, having three phase-windings each comprising a first winding component of six coils, together wound in eighteen equally spaced-apart slots of a frame having 18 N slots in total, where N is a plural integer, each phase-winding comprising $(N-1)$ further winding components, that is to say at least one further winding component, of six coils, together wound in eighteen other equally spaced-apart slots of the frame, thereby filling all said slots, the coils of all the winding components of each phase-winding being serially connected together in four winding sections defined by connecting taps, each said section comprising an equal number of coils of the N winding components together, the said serial connection providing one of said second and third pole-numbers, each phase-winding being reconnected at said taps as a series-parallel arrangement of two parallel circuits each of two said sections, to provide the other one of said second and third pole-numbers and being reconnected at said taps as a four-parallel arrangement, each of one said section, to provide said pole-number of X-poles, corresponding coils of different said winding components of each phase-winding being spaced apart to neutralise at least one harmonic of one of said three pole-numbers.

11. A three-phase, alternating current pole-changing rotary electric machine as claimed in claim 10 in which the lowest pole-number is provided by the four parallel connection and the highest pole-number is provided by the series connection of said winding sections.

12. A three-phase, alternating current pole-changing rotary electric machine as claimed in claim 10, in which the pitch of the coils throughout the three-phase windings is chosen to reduce the amplitude of at least one other harmonic of one of said three pole-numbers.

References Cited by the Examiner

UNITED STATES PATENTS

| | | | |
|---|---|---|---|
| 2,715,204 | 8/1955 | Siskind | 318—224 |
| 2,820,938 | 1/1958 | Davies | 318—224 |
| 3,016,482 | 1/1962 | Anderson | 318—224 |
| 3,175,142 | 3/1965 | Rawcliffe | 318—224 |
| 3,175,144 | 3/1965 | Rawcliffe | 318—224 |
| 3,197,686 | 7/1965 | Rawcliffe et al. | 318—224 |
| 3,221,233 | 11/1965 | Cantonwine | 318—224 |

ORIS L. RADER, *Primary Examiner.*

G. Z. RUBINSON, *Assistant Examiner.*